(12) United States Patent
Hart

(10) Patent No.: US 8,881,642 B2
(45) Date of Patent: *Nov. 11, 2014

(54) BREWER CALIBRATION SYSTEM

(75) Inventor: Burton L. Hart, Auburn, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 1702 days.

This patent is subject to a terminal disclaimer.

(21) Appl. No.: 11/577,174

(22) PCT Filed: Oct. 14, 2005

(86) PCT No.: PCT/US2005/037878
§ 371 (c)(1),
(2), (4) Date: Oct. 22, 2007

(87) PCT Pub. No.: WO2006/045039
PCT Pub. Date: Apr. 27, 2006

(65) Prior Publication Data
US 2008/0168905 A1    Jul. 17, 2008

Related U.S. Application Data

(60) Provisional application No. 60/619,431, filed on Oct. 15, 2004.

(51) Int. Cl.
*A47J 31/40* (2006.01)
*A47J 31/46* (2006.01)

(52) U.S. Cl.
CPC ................................ *A47J 31/46* (2013.01)
USPC ................ 99/280; 99/275; 99/279; 99/285; 99/452; 426/286; 426/295; 426/431; 426/433; 426/435; 426/590; 426/597

(58) Field of Classification Search
CPC ............... A23L 2/00; A23F 3/18; A23F 5/26; A47J 31/00
USPC ............ 99/275, 452, 279, 280, 285; 426/286, 426/295, 431, 433, 435, 590, 597
See application file for complete search history.

(56) References Cited

U.S. PATENT DOCUMENTS 3,261,279 A * 7/1966 Kaplan et al. ................... 99/282
5,094,153 A   3/1992 Helbling
5,465,650 A * 11/1995 Friedrich et al. ................ 99/286
(Continued)

OTHER PUBLICATIONS

International Search Report issued in application No. PCT/US2005/037878 (2005).

Primary Examiner — Dana Ross
Assistant Examiner — Brett Spurlock
(74) Attorney, Agent, or Firm — Barnes & Thornburg LLP

(57) ABSTRACT

A beverage brewer having a water flow control system for controlling the flow water through the system during a brewing cycle. The water flow control system is related to the spray head used in the brewer. The system can be calibrated based on the spray head used with the system and the calibration information can be used during the brewing process. An information device may be provided on the spray head to communication information to the brewer to control the brewing process. The brewer may be provided with a reader to read the information from the spray head. A system which can be used with a brewer, including all of the aforementioned information associated with the spray head for use in controlling the water flow during a brewing cycle. The system can be provided with the brewer or retrofitted with an existing brewer.

22 Claims, 2 Drawing Sheets

(56) References Cited

U.S. PATENT DOCUMENTS

| | | | |
|---|---|---|---|
| 5,733,591 A * | 3/1998 | Goerndt | 426/231 |
| 5,858,437 A | 1/1999 | Anson | |
| 5,862,738 A * | 1/1999 | Warne | 99/281 |
| D409,432 S * | 5/1999 | O'Keefe | D7/309 |
| 6,164,189 A * | 12/2000 | Anson | 99/281 |
| D440,109 S * | 4/2001 | Anton et al. | D7/307 |
| 6,626,190 B2 * | 9/2003 | Durth et al. | 134/22.18 |
| 2003/0000392 A1 * | 1/2003 | Lassota | 99/279 |
| 2003/0003208 A1 | 1/2003 | Lassota | |
| 2003/0126993 A1 * | 7/2003 | Lassota et al. | 99/279 |
| 2004/0103791 A1 * | 6/2004 | Hart et al. | 99/279 |
| 2004/0112224 A1 | 6/2004 | Drobeck | |
| 2005/0126401 A1 * | 6/2005 | Streeter et al. | 99/279 |
| 2005/0150391 A1 * | 7/2005 | Schifferle | 99/295 |
| 2006/0196363 A1 * | 9/2006 | Rahn | 99/279 |
| 2006/0222736 A1 * | 10/2006 | Keller | 426/45 |

* cited by examiner

BREWER CALIBRATION SYSTEM

CROSS-REFERENCE TO RELATED PATENT APPLICATION

This patent application claims the benefit of U.S. Provisional Patent Application No. 60/619,431, filed Oct. 15, 2004. The disclosure set forth in the referenced provisional application is incorporated herein by reference in its entirety, including all information as originally submitted to the United States Patent and Trademark Office.

BACKGROUND

The present disclosure relates to a system method and apparatus for controllably calibrating and identifying spray heads and associated water delivery and control systems for use in brewing beverages.

A variety of beverage brewing apparatus have been developed which dispense heated water over a brewing substance which might include, by way of example, coffee, tea or any other brewing substance. The beverage brewing substance is saturated with heated water to produce a brewed beverage. The beverage is dispensed into a suitable container for serving or storage.

Such beverage brewing apparatus include a water dispensing system usually including some form of water heating device and lines connecting the water heating device to a spray head. Water dispensed to the spray head is distributed over the brewing substance. There may be a control device, either active or passive, associated with the water dispensing system for controllably delivering the water from the water heating device to the spray head.

It would be useful to controllably, accurately and repeatably dispense water to the brewing substance. While there are a variety of systems which can control the water flow from the water heating device to the spray head, there is no known control which controls a system depending on the spray head used with the system or accounts for variations between two or more spray heads connected to a water heating device.

By way of example but not limitation, brewers have been produced which provide a single hot water source, for example a heated water reservoir, which provides water to two or more spray heads. In this type of brewer, the single hot water source is connected by lines to each spray head. In such a brewing device there may be variations between the flow rate or dispensed volume of each spray head.

With the foregoing in mind, it would be useful to provide a system, method and apparatus for controlling the dispensing of heated water to one or more spray heads. It may also be useful to retain related control settings associated with the apparatus and at least the spray head for subsequent and repeatable use. It also could be desirable to include this feature as a recipe component for producing brewed beverage. Additionally, it may be useful to provide a system, method and apparatus for determining the flow rates of each spray head associated with the apparatus and setting these flow rates relative to the system. As yet an additional matter, it may be useful to calibrate the system for use with at least one and possibly two or more different spray heads. Each spray head associated with a separate system of the brewer yet receiving brewing water from a single water heating device.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which:
The detailed description particularly refers to the accompanying figures in which.

Figure 1:
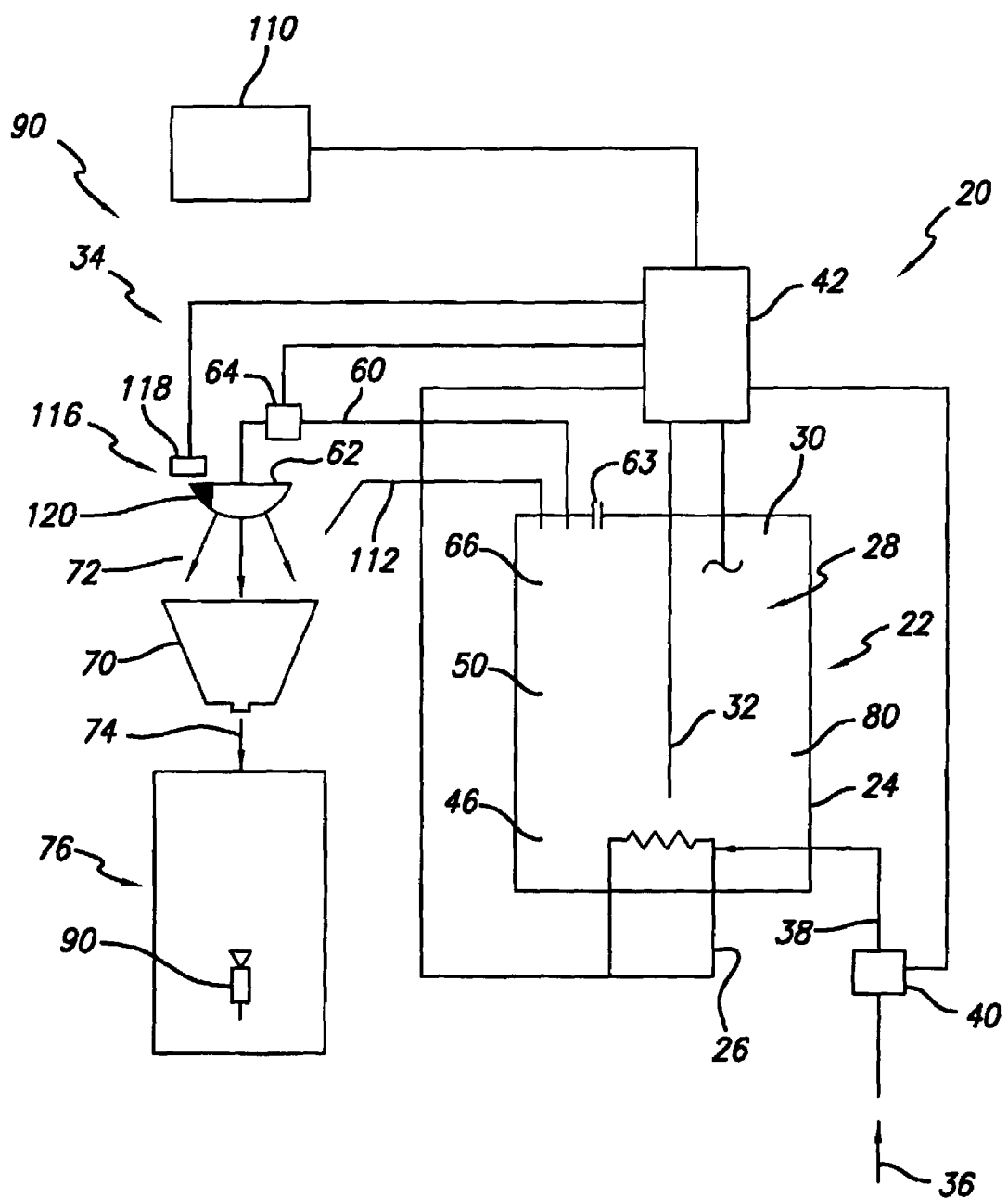
FIG. 1 is a general diagrammatic illustration of a brewer which includes a water heating device which supplies water to a spray head, the brewer being configured to deliver water to a spray head.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

The Figures provide a variety of diagrammatic illustrations relating to the present disclosure. All these illustrations are intended for use with a heated water system and more particularly may be used with a heated water system which is used for producing a brewed beverage. It should be understood that the present disclosure is not limited to the system, but is intended to be broadly interpreted to include all applications such as described in detail herein and which might be developed based on the disclosure provided herein.

While the term "heated" may be used throughout this disclosure, the term is to be broadly interpreted to include all forms of water or dilution liquid of any temperature, generally in which the water has been heated. The term heated includes the term "hot" such that one might consider the water to be hot based on the numerical temperature. Generally, the temperature of the water is below or at the relevant boiling temperature (212 degrees F. at sea level) above which the water will generally transform to steam. The term heated is used to distinguish from the term unheated such that unheated water is generally introduced into the reservoir during the brewing cycle. In or near the reservoir the water is heated resulting in heated water.

The present disclosure may be used in connection with a variety of beverage making machines. Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but not be limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials to obtain a desired beverage or food product. This broad interpretation is intended to include, without limitation, at least funnel and filter-type, packet or pouch-type, pod-type or other prepackaged or unpackaged forms of retaining and brewing a beverage or making of a food product. The terms heated water may be interpreted as hot water, and generally refers to adding energy to water to heat the water above ambient temperature.

While the disclosure shows an illustration of a brewer as described, it is intended and understood that the term brewer is to be broadly interpreted to include brewers of any configuration including that as shown as well as, by way of example but not limitation, single cup or pod brewers. Pod brewers are brewers which retain a pod or prepackaged beverage product and deliver to or force water through the pod to brew a beverage. Many pod brewers produce one or two cups of beverage instead of 4-12 cups as is produced by many other brewers. Pod brewers may be configured consistent with the teachings of this disclosure to be connected to a pressurized water line and provide line pressure brewing. The teachings of this disclosure are intended to be broadly interpreted and applied to a variety of brewer sizes, styles and configurations consistent with the principals disclosed herein.

With reference to FIG. 1, a brewer 20 is shown. The diagrammatic illustration is for purposes of the present disclosure only and is not intended to represent a specific brewer design or in any way to limit the present disclosure. The brewer 20 includes a water heating device 22. A variety of water heating devices are known in the art and the embodiment generally shown is of the type which includes a water reservoir 24, a heating device 26, and one or more sensors 28. The sensors 28 may include, but are not limited to, a level sensor 30 and a temperature sensor 32. The heating device 22 is part of a water dispensing system 34 in which water 36 is introduced through an inlet line 38 to the reservoir 24. A controllable inlet valve 40 communicating with the inlet line 38 is coupled to a controller 42 for controllably admitting or introducing water to the reservoir 24. The inlet line 38 is shown as a pressurized water source. However, other sources of water may be used in association with the disclosed system such as a gravity feed water system or a source such as a fill water basin or other container of water. Water 36 introduced to the reservoir 24 is generally added in a lower portion 46 of the reservoir 24, generally proximate to the heating device 26. The temperature sensor 32 senses a representative temperature of the water 50 in the reservoir 24 while level sensor 30 detects a level or range of levels in the reservoir 24.

Examples of different types of brewers include by way of example but not limitation, Bunn-O-Matic Dual DBC, Single DBC, Bunn CDBC or pour over brewers which are manufactured by Bunn-O-Matic Corporation of Springfield, Ill., the assignee of this disclosure. All of the information and materials relating to these devices are incorporated herein by reference.

An outlet line 60 is connected to and communicates with the reservoir 24 for dispensing water 50 from the reservoir 24 to a corresponding spray head 62. A controllable valve 64 along the outline line 60 is coupled to the controller 42. Water 36 introduced into the reservoir 24 displaces water in an upper portion 66 of the reservoir 24. The displaced water flows through the outlet line 60. A vent 63 is provided in the upper portion 66 of the reservoir 24. When the controllable valve 64 is controlled to an open position, water flows through the outlet line 60 to the spray head 62. When water flows to the spray head 62 it can flow into a funnel 70 positioned to receive water from the spray head 62. A quantity of brewing substance (not shown) is retained in the funnel 70 in a known manner consistent with the teachings of the brewer technology. The substance is infused by water 72 flowing from the spray head to produce a brewed beverage 74 which is dispensed into a server 76 positioned there below. Other systems that do not use a controllable valve on the outlet line or which provide other ways to displace water from the reservoir 24 are included in this disclosure. The structure and method of dispensing water is to be broadly interpreted to include any variation and configuration which can be configured to work with the present disclosure.

A water flow control system 90 is provided with the brewer 20. The water flow control system includes a spray head 62 and at least one of an input device 110 and a reader device 118. The input device can be used to manually enter information relating to the spray head 62 so that the system will operate in accordance with the spray head parameters or information. A reader device will be described in greater detail below. A reader device 118 will be described in greater detail below but also provides information to the controller 42 relating to the spray head. The water flow control system 90 operates the brewer in response to information or characteristics relating to the spray head 62. It should be noted that while the term spray head is used throughout this application, other structures which may not "spray" but yet deliver water to a brewing substance in a brewing process are to be included in this term. As such, the term spray head is to be broadly interpreted to include all devices or structures which deliver water from a water dispensing system to brewing substance. The water flow control system takes into account the characteristics or other information relating to the spray head to provide control information to the brewer which may affect the beverage produced by the brewer. Additionally, in an least one embodiment, an information device 120 is attached to or otherwise associated with the spray head for detection and reading by the reader 118.

In the embodiment in which information is entered through the input device 110, information can be inputted and saved at the controller 42 for a specific spray head as well as a specific type of spray head. In this regard, a specific spray head may be identified by a specific serial number or other indication. A specific type of spray head may relate to a model or other identification for a type of spray head and not necessarily a specific individual spray head. This may be important in settings in which a specific single spray head might have different characteristics than a widely used model or family of spray heads. In this regard, a family of spray heads may have sufficiently similar or identical flow characteristics to be classified as a spray head for control purposes yet have different physical dimensions or mounting attachments which might be used to attach the spray head to the water dispensing system.

As shown in FIG. 1, the reservoir 24 containing water 50 within a cavity 80 defined by the reservoir 24 is heated by the heating element 26. The heating device 26 is coupled to or otherwise communicates with the controller 42. Various forms of heating device 26 are fully within the scope of the present disclosure and are considered to be broadly interpreted and included herein. While a resistive type of heating element 26 is shown in the present diagrammatic illustration of FIG. 1, it is envisioned that various other forms of heating elements, such as external blanket heating elements which contact or otherwise are positioned proximate to the wall of the reservoir 24 are within the scope of the present disclosure. Additionally, other forms of providing energy, including mechanical, vibrational, microwave or other sources such as passive heating elements for example heat retaining and dissipating bodies are considered to be included within the scope of the present disclosure.

The funnel 70 is shown in a diagrammatic form. It will be appreciated that any variety of funnels or other structures for holding brewing substance can be used in the present disclosure. The general diagrammatic illustration of the funnel 70 as shown in FIG. 1 is provided by way of example and not limitation. Similarly, the use of a server 76 is shown as a generally recognized thermal type of server container. The server container 76 includes a reservoir and a controllable faucet 90. Beverage 74 is dispensed into the server 76 and controllably dispensed by a user through the faucet 90. While a form of server 76 is shown, it is envisioned that any variety of serving device may be used, including individual serving cups, carafes or any other form of container for receiving coffee. Additionally, some form of direct dispensing line may be used with the present disclosure.

Figure 2:
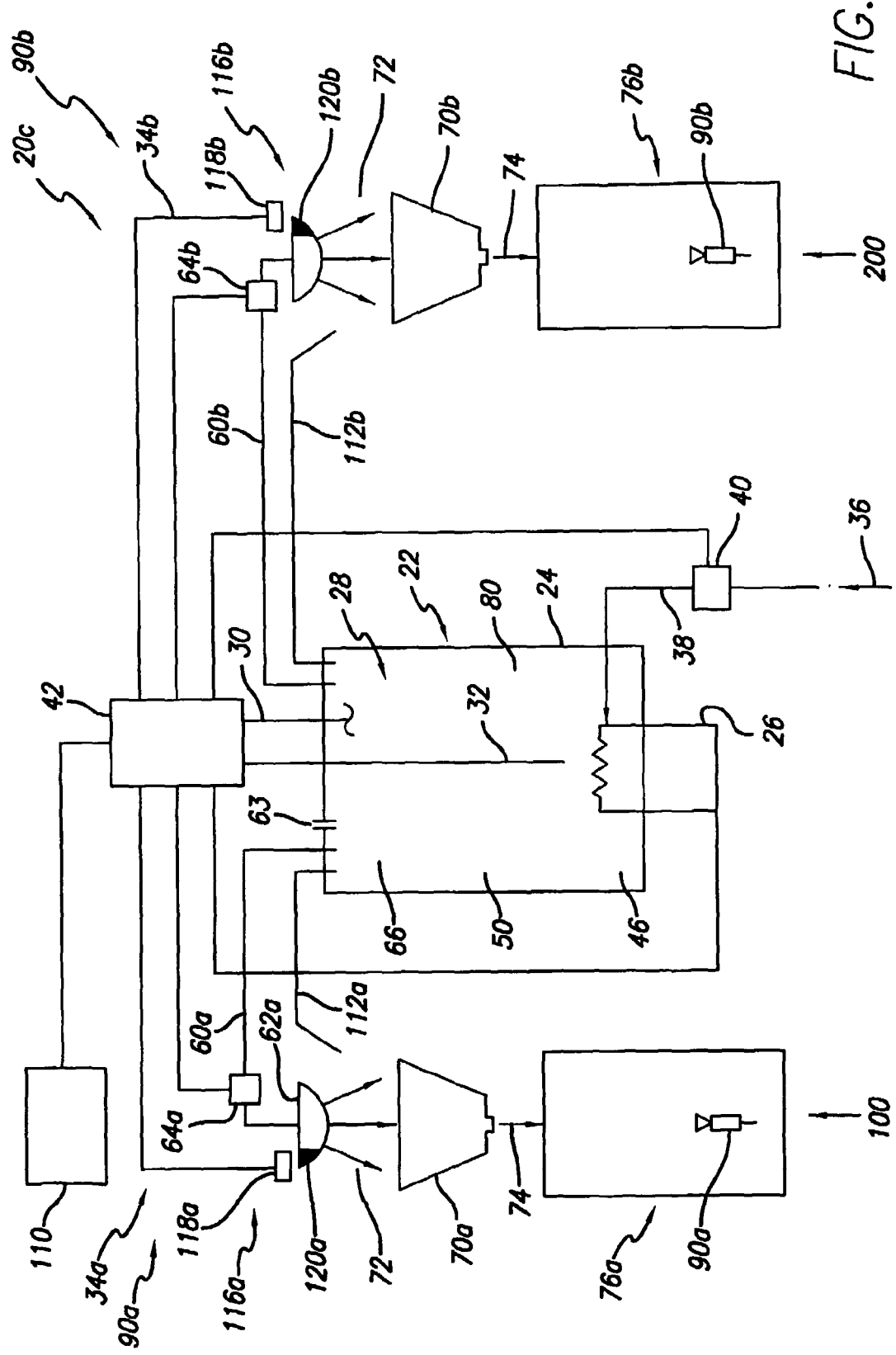
FIG. 2 is a general diagrammatic illustration of a brewer which includes a single water heating device and a plurality of spray heads which receive water from the water heating device.

The present disclosure, as will be further described with regard to FIG. 2, also relates to the controllable and calibrateable water dispensing system 34. With reference to FIG. 2, a two-head or dual brewing system is illustrated. Similar or identical elements as shown in FIG. 1 are referred to with the same reference numbers. Multiple devices, as shown in FIG. 2 are identified by alphabetic suffixes "a" and "b".

With reference to FIG. 2, the dual or two-headed brewer includes a pair of spray heads 62a, 62b connected to and communicating with the reservoir 24. In this configuration, a first system 100 and second system 200 can be generally identical or may include structural and/or functional differences or variations for a variety of reasons. For example, the systems 100, 200 may be identical in that they use the same server 76a, 76b, same funnels, 70a, 70b, same spray head 62a, 62b, same outline lines 60a, 60b and same control valves 64a, 64b. Alternatively, there may be variations between the systems 100, 200 which may be intentionally designed into the brewer 20c or as a result of other circumstances such as operation or structural limitation or to offer two different types of brewers sharing a singe heated water reservoir Even when starting with brewer systems 100, 200 that are identical, it is still possible to have some variation in the flow rate associated with each system 100, 200. In this regard, differences in the position of the outlet line 60a, 60b; position, structure or operation of the control valve 64a, 64b; and variations in the position, structure or operation of the spray head 62a, 62b may singularly or cumulatively result in measurable variations between the systems 100, 200. In this regard, these variations may be introduced by way of manufacturing tolerances, positions of the components or routing of the line 60a, 60b which might be required by the available space within the brewer. Also, operating variations may occur including, by way of example and not limitation, accumulation of lime, mineral deposits or other accumulation in the system. Regardless of the reason for the variations, it may be useful in some circumstances to accommodate such variations and calibrate the system to account for and/or compensate for the variations.

The dual brewer as shown in FIG. 2 includes components which communicate with or are otherwise coupled to the controller 42. It should be noted that the controller 42 shown in FIGS. 1 and 2 is identified in this description as being the same controller. This would allow the same controller to be used with either the single or dual system. By coupling the component to the controller, the controller can be calibrated to account for the different variations. A fundamental consideration is that the system 20c can be configured to dispense water on a time dispensing or volume dispensing basis.

With this in mind, the controller can be calibrated for each system 100, 200 and store values related to the time to achieve similar results on each side of the brewer. For example, if the configuration, materials, tolerances or other characteristics of the water dispensing system 34a of the first system 100 results in a different flow rate, for example higher or lower flow rate of water 72a out of the spray head, compared to the water dispensing system 34b of the second system 200 the controller 42 can be configured to store values related to the differences. In this regard, the controller includes a suitable circuit, software or other features which will allow it to be calibrated, sense, and store values as well as any other attributes and any other form of functionality necessary to accommodate the variations between the first system 100 and second system 200. The brewer 22 may be operated during an initial testing cycle, for example during manufacturing, to recognize the differences between the first system 100 and second system 200. Suitable calibration tests can be executed on the systems 100, 200 to measure the volume of water and the flow rate of water dispensed during a predefined time period. This calibration test can be used to set the flow rate or flow constants for each system 100, 200. For example, the volume or measure of water dispensed through the water dispensing systems 34a, 34b can be measured by volume, flow rate, weight, optical sensing means, electrical sensing means, as well as any other currently available or after developed sensing system for measuring the differences between the water dispensing systems 34a, 34b. The calibration test or cycle can be run periodically or on demand during the operating life of the apparatus.

An input device 110 is coupled to the controller 42 to allow a user to controllably alter or add information to the controller and the stored values relating to the first system 100 and second system 200. In this regard, even though the initial values may be pre-established or preset, the input device 110 allows the values to be modified, or can be added by way of recipes. Recipes can be programmed by any form of programming known, including programming at the input device 110, introduction by way of downloading information to the controller 42 directly at the machine or remotely via any form of communication connection, RFID devices carried on the funnel or manually presented to the machine, or any other known method or device for introducing a recipe to the controller. The recipe can alter the flow constant for the given side so that the flow rate and other characteristics related to the quantity or rate of water flow can be introduced into the system. This can result in the recipe altering this information for one brew cycle, multiple brew cycles or indefinitely.

It should also be noted that a bypass dispensing line 112a, 112b can be provided with the system. In this regard, in some circumstances it may be desirable to allow water to bypass the beverage brewing substance or grounds such that a portion of the water used to produce the brewed beverage bypasses the grounds and is not used to infuse the brewing substance. The bypass water generally carries a lower concentration of beverage solids and other characteristics since it generally does not directly contact or pass through the brewing substance. In some circumstances, the bypass water may completely bypass the beverage brewing substance carrying virtually no beverage components. Regardless of the specific type of bypass, such bypass systems are well known in the art. The present disclosure envisions that the bypass systems 112a, 112b can be individually configured and calibrated in the same manner as described hereinabove for the other portions of the water dispensing system 34a, 34b.

It should be appreciated that, based on the present disclosure, the teachings as described above with regard to the dual system also apply to the single system as shown FIG. 1. As such, the water delivery system 34 shown in FIG. 1 can also be calibrated and values can be stored in the controller 42.

In use, the system can be calibrated to account for flow characteristics, volume or other characteristics associated with the water delivery system 34. The calibration can occur during the initial manufacture of the brewer or at some subsequent time. The calibrated characteristics are used to influence or as a component of the recipe so as to provide increased precision, accuracy and performance of the brewer 20. While some of these differences may be characterized as being small, such differences may be measurable and, as such, may influence the resultant beverage which is produced by the system. Depending on the setting, such differences may be important to the production of a brewed beverage.

Another application of the present system, method and apparatus is to accommodate different types of spray heads. For example, the dual system as shown in FIG. 2 is initially described as having spray heads 62a and 62b which are identical. However, it is envisioned that there may be situations in which two different spray heads may be useful. For example, in a dual brewer, it may be useful to provide one spray head which produces increased flow to the beverage brewing substance, whereas the second spray head provides less flow or a restricted flow to the spray head. These different flow rates may be useful to control the type and flow of water to the beverage brewing substance. When used with the same beverage brewing substance, different tastes or taste profile characteristics may be derived. Also, it may be desirable to provide different spray heads for use with different beverage brewing substances such as tea, herbs, different types of coffee and different grounds of coffee.

With the foregoing in mind, it is also envisioned that different bypass characteristics may be desirable. While the bypass characteristics can be programmed, it is also desirable to calibrate and account for variations between the different bypass characteristics.

When using different spray heads, the user may store the flow constant for a first spray head and any subsequent spray heads. In this regard, the user can install a first spray head and calibrate the system for that spray head resulting in a flow constant associated with that spray head. This first flow constant can be stored in the controller 42 for use when the first spray head 62a is used on the machine. A second spray head can be installed on the same system 100 and calibrated with the calibrated flow constant being stored in the controller. As a result, the system can be set up with multiple flow constants for each system 100, 200 to allow increased flexibility and use of the brewer. The stored flow constant values reduce or eliminate the need for a user to conduct a calibration cycle every time a spray head is changed. In other words, if the user changes a spray head, the user only needs to change the spray head and select the type of spray head employed in the system. The user can enter the type of spray head or select the type of spray head at the input device 110 whereupon the system will automatically calibrate any given recipe for the flow constant associated with the installed spray head.

Alternatively, the spray head and system may be provided with a communication device 116a, 116b. The communication device includes a reader device or reader 118a, 118b and an information device 120a, 120b. As a result, the communication devices 116a, 116b can be employed to automatically read the type of spray head used. In this regard, a variety of spray heads can be calibrated for a specific machine during the manufacturing process and the corresponding values stored. The variety of spray heads can be provided with the brewer or sold separately. Regardless of how the spray heads are associated with the brewer, the spray head includes a device 120a, 12b such as, by way of example but not limitation, an RFID or other identification device. A variety of information devices 116 may be used. The information devices may be in the form of an active device which transmits a signal or a passive device which is merely read by the reader 118. A variety of information can be provided, including, but not limited to, specific flow control information and settings relating to the spray head, an identification number of the spray head, a model number of the spray head or any other information that might be used to identify the spray head or provide information which can be used to control the brewing process. For example, one way in which the spray head might work with the controllers to provide an identification of the type or specific model number of spray head. This information then can be used by the controller to look up information relating to that model number. In this regard, the least amount of information can be used to identify the spray head while providing the ability to look up additional information resident at the controller 42 to adjust the brewing processes. One skilled in the art with the teaching provided herein will be able to devise additional embodiments and equivalents based on this information. As noted above, information may be saved at the controller. In this regard, the controller is intended to include, and is necessary for the specific embodiment, a microprocessor, memory, and any other additional devices that are necessary to control the brewer. The reader 118a, 118b is carried on the brewer proximate to the spray head. When the spray head is installed on the brewer, the information or identification device 120a, 120b is read by the corresponding reader 118a, 118b to indicate the type of spray head installed on the brewer. Once this is detected by the brewer, it can then select the appropriate flow constant information related to the installed spray head.

In an alternate embodiment, the reader 118 can be positioned with or be part of the input device 110. In this regard, the input devices envisioned to include some form of control panel and, if necessary, display to allow user to input the information. The input device may also include a reader appropriate for the type of information device used with the funnel. This would allow the user to position input information at the input device as well as to present information in the form of rfid chips, bar codes, and any other form of information input device which may be associated with yet separate from the spray head. For example, a spray head may be delivered separately from the brewer. The spray head may be packaged with a card or other device including a chip retained thereon. The card could be waved or positioned in front of the rfid reader to program the information relating to the spray head.

As an additional embodiment of the reader and information device, it is envisioned that a spray head could be provided with protrusions or other physical structures which could be read by a corresponding reader. These protrusions or physical structures might act on sensors or other structures on the reader to identify the spray head. For example, protrusions or recesses may be provided on the spray head, which are sensed by devices on the reader. The physical structures, while not containing or transmitting information, provide information to the reader.

It should be noted that the readers are coupled to the controller 42b. This system uses information devices 116 and readers 118 to indicate or detect the presence or absence of a spray head 62 on the machine. A relatively common problem in the beverage industry is to not replace the spray head 62 after it is removed during periodic or incidental maintenance. By use of the information device 116 and reader 118 coupled to the controller 42 the machine can detect a missing spray head and provide a response to this event. For example, if a spray head is missing the controller 42 may be programmed to lock out operation of the machine and/or signal the operator to take an appropriate action, such as replace or install a particular spray head. Once the spray head is installed operation of the machine is returned.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A beverage brewer comprising:
at least one water heating device for receiving water and heating water for use in a brewing process,
at least one controllable water dispensing system communicating with the water heating device for controllably dispensing water from the water heating device,
a controller coupled to the controllable water dispensing system,
a spray head of the water dispensing system in communication with the water dispensing system for dispensing water from the water dispensing system through the spray head,
a water flow control system communicating with the controller for calibrating and controlling the flow of water from the water dispensing system through the spray head;
a reader device coupled to the controller,
an information device on the spray head whereby the information device can be removed from the brewer by removing the spray head from the brewer, the information device containing information relating to the characteristics of the spray head, the reader obtaining information from the information device for use in controlling the flow of water in relation to the spray head information.

2. The beverage brewer of claim 1, further comprising an input device coupled to the controller, the input device being operable by a user to controllably input and save settings relating to the flow of water from the brewer in relation to a predetermined spray head, the settings being saved in the controller.

3. The beverage brewer of claim 2, wherein the settings are saved for a specific spray head.

4. The beverage brewer of claim 2, wherein the settings are saved for a specific type of spray head.

5. The beverage brewer of claim 2, where in the brewer includes at least two controllable water dispensing systems, each of the controllable water dispensing systems communicating with a water heating device, the water heating device providing water to each of the controllable water dispensing systems.

6. The beverage brewer of claim 5, wherein the settings are saved for a specific spray head associated with a specific one of the at least two controllable water dispensing systems.

7. The beverage brewer of claim 5, wherein the settings are saved for a specific type of spray head associated with a specific one of the at least two controllable water dispensing systems.

8. The beverage brewer of claim 1, wherein the reader device is positioned on the brewer proximate to the spray head.

9. The beverage brewer of claim 1, wherein the information device is provided separately with the spray head.

10. The beverage brewer of claim 1, wherein the information device is attached to a spray head.

11. The beverage brewer of claim 1, wherein the reader is positioned on the brewer proximate to the spray head, the information device is attached to the spray head, the spray head being attached to the brewer in a position to facilitate transfer of information from the information device to the reader device.

12. The beverage brewer of claim 1, wherein the information device is a passive device and the reader actively reads the passive information device.

13. The beverage brewer of claim 1, wherein the information device is an active device and actively transmits information to the reader device.

14. The beverage brewer of claim 1, further comprising the reader device communicating with the controller for reading the information device attached to the spray head, the information device containing spray head information.

15. The beverage brewer of claim 1, wherein the information device contains brewing recipe information including at least information relating to the control of water flow during a brewing cycle by the controllable water dispensing system.

16. A beverage brewer comprising:
a water heating device for receiving water and heating water for use in a brewing process,
at least one controllable water dispensing system communicating with the water heating device for controllably dispensing water from the water heating device,
a controller coupled to the controllable water dispensing system,
a spray head of the water dispensing system in communication with the water dispensing system for dispensing water from the water dispensing system through the spray head,
a water flow control system communicating with the controller for controlling the flow of water from the water dispensing system through the spray head,
the water flow control system including at least one of an input device and a reader device being coupled to the controller for communicating information to the controller relating to the spray head for use in controlling the brewer;
an information device on the spray head whereby the information device can be removed from the brewer by removing the spray head from the brewer, the information device containing information relating to the characteristics of the spray head, the reader obtaining information from the information device for use in controlling the flow of water in relation to the spray head information.

17. The beverage brewer of claim 16, further comprising the input device being operable by a user to controllably calibrate and save settings relating to the flow of water from the brewer in relation to a predetermined spray head, the settings being saved in the controller.

18. The water flow control system of claim 16, wherein the settings are saved for a specific spray head.

19. The water flow control system of claim 16, wherein the settings are saved for a specific type of spray head.

20. The water flow control system of claim 16, where in the brewer includes at least two controllable water dispensing systems, each of the controllable water dispensing systems communicating with a water heating device, the water heating device providing water to each of the controllable water dispensing systems.

21. The water flow control system of claim 20, wherein the settings are saved for a specific spray head associated with a specific one of the at least two controllable water dispensing systems.

22. The water flow control system of claim 20, wherein the settings are saved for a specific type of spray head associated with a specific one of the at least two controllable water dispensing systems.

\* \* \* \* \*